No. 711,217. Patented Oct. 14, 1902.
J. C. KIMSEY.
CHRISTMAS TREE HOLDER.
(Application filed Feb. 24, 1902.)
(No Model.)
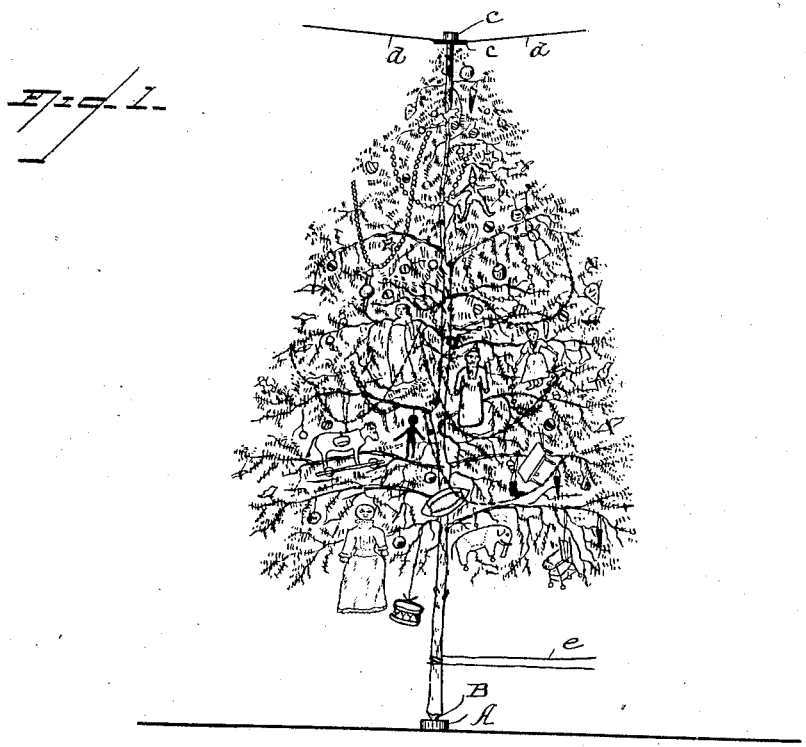
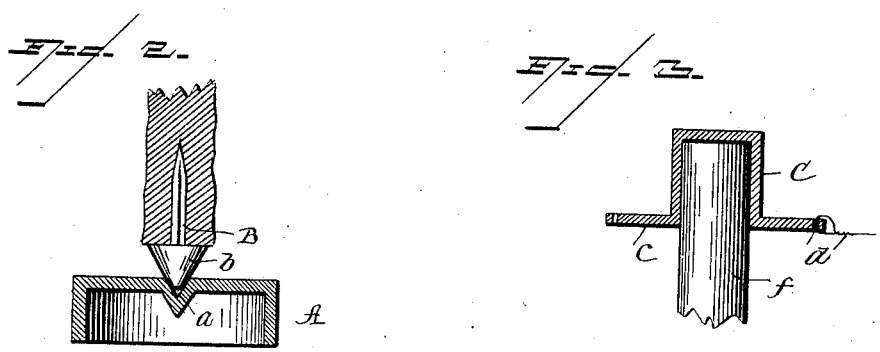
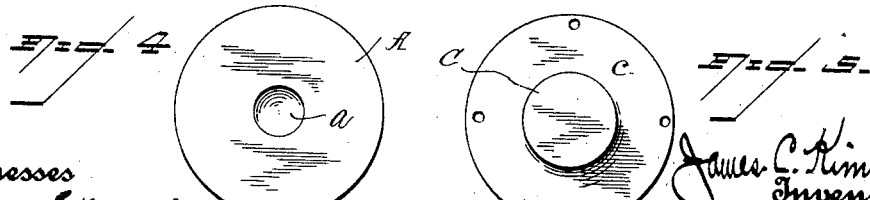

UNITED STATES PATENT OFFICE.

JAMES C. KIMSEY, OF PHILADELPHIA, PENNSYLVANIA.

CHRISTMAS-TREE HOLDER.

SPECIFICATION forming part of Letters Patent No. 711,217, dated October 14, 1902.

Application filed February 24, 1902. Serial No. 95,313. (No model.)

*To all whom it may concern:*

Be it known that I, JAMES C. KIMSEY, a citizen of the United States, and a resident of Philadelphia, in the county of Philadelphia and State of Pennsylvania, have invented certain new and useful Improvements in Christmas-Tree Holders, of which the following is a specification.

The object of my invention is to provide simple and effective means for rotatably supporting a Christmas tree in an upright position and which shall be cheap in construction and may be easily and conveniently applied, even by an inexperienced person and without injury to a carpet or any part of the room in which the tree may be located.

The invention contemplates the employment of certain devices which are attached or applied to the upper and lower ends of the tree for the purpose not only of supporting the tree firmly in an upright position, but also to provide for turning the tree in either direction, so that all sides of the same may be viewed from one point of observation.

With the foregoing objects in view the invention consists in the particular construction and application of the holding means, all as will be hereinafter fully described, and specifically set forth in the appended claims.

In the accompanying drawings, which form a part of this specification, Figure 1 is a side elevation showing the application of my invention. Fig. 2 is an enlarged detail sectional view of the supporting means located at the lower end of the tree. Fig. 3 is a sectional view of the supporting means at the upper end of the tree. Fig. 4 is a plan view of the supporting base or socket. Fig. 5 is a plan view of the upper socket.

Like letters of reference indicate like parts in the several views of the drawings.

A designates a supporting base or socket, which is preferably a cylindrical box open at its lower end. In the top of this box, at the center thereof, is a conical recess or socket $a$, formed by stamping the said top inward, the said recess or socket $a$ being adapted to receive the conical head $b$ of a bearing-pin B, driven into the lower end of the Christmas tree. The supporting-base and bearing-pin form a pivotal support for the lower end of the Christmas tree, the lower edge of the cylindrical box resting upon the carpet and is held in place by the weight of the tree.

C designates a socket which is adapted to support the upper end of the tree and maintain the same in a vertical position, the said socket having an outwardly-projecting flange $c$ at its lower or open end apertured for the attachment thereto of strings $d$, adapted to hold the socket in place, the said strings being secured to the side walls of the room by nails or by means of the ordinary picture-moldings. In conjunction with the upper socket C, I employ a stick $f$, preferably a part of an ordinary broom-stick, which is attached to the upper part of the tree with the end thereof bearing in the said upper socket. In applying the stick it is bound to the upper part of the tree by means of a string, after which green tissue-paper is wrapped around the stick to conceal it.

In the application of the supporting devices the bearing-pin B is driven into the lower end of the tree and the stick is bound to the upper end thereof, the supporting-base or cylindrical box A is placed where the tree is to stand, and the said tree is stepped thereon in the socket $a$ of said supporting-base or cylindrical box, after which the upper socket C is placed upon the upper end of the stick and braced or steadied by means of the strings $d$. In this way the tree is firmly supported in an upright position and having a pivoted bearing at both its upper and lower ends may be easily turned. If desired, the tree may be turned by means of a cord $e$, the said cord being given a couple of turns around the trunk of the tree, so that the tree may be turned by drawing upon the ends of the cord.

It will be noted that the devices for rotatably supporting the tree are simple and cheap in construction, and can therefore be made and sold at small cost and that when applied will firmly support the tree.

By forming the supporting-base of the shape shown the lower edge of the open end thereof will secure a proper bearing upon a carpet and will not injure the same in any manner.

The advantages of a rotatably-supported Christmas tree are obvious, as it is not only convenient in trimming the tree, but also permits the tree to be turned after it is trimmed, so as to permit all sides to be viewed from a single point of observation.

Having thus described my invention, I claim—

1. In a Christmas-tree holder, the combination of a supporting-base, a bearing-pin secured to the lower end of the tree, an upper bearing-socket, and a stick secured to the upper end of the tree and bearing in the upper socket.

2. In a Christmas-tree holder, the combination, of a metal box A having a socket in its upper end, a bearing-pin secured to the lower end of the tree and bearing in said socket, an upper socket and strings for holding the same in place, and a stick secured to the upper end of the tree and bearing in said upper socket.

In testimony whereof I affix my signature in the presence of two witnesses.

JAMES C. KIMSEY.

Witnesses:
FRANK D. BLACKISTONE,
HORACE S. BEALL.